(12) United States Patent
Mercier et al.

(10) Patent No.: US 10,467,042 B1
(45) Date of Patent: Nov. 5, 2019

(54) OPTIMIZED DEPLOYMENT BASED UPON CUSTOMER LOCALITY

(71) Applicant: Amazon Technologies, Inc., Seattle, WA (US)

(72) Inventors: Benjamin W. Mercier, Issaquah, WA (US); Joseph E. Fitzgerald, Seattle, WA (US); Eric J. Brandwine, Haymarket, VA (US); Marvin M. Theimer, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/261,401

(22) Filed: Jan. 29, 2019

Related U.S. Application Data

(63) Continuation of application No. 13/095,554, filed on Apr. 27, 2011, now abandoned.

(51) Int. Cl.
| | |
|---|---|
| *G06F 9/46* | (2006.01) |
| *G06F 9/455* | (2018.01) |
| *G06F 8/60* | (2018.01) |
| *H04L 29/08* | (2006.01) |

(52) U.S. Cl.
CPC .......... *G06F 9/45558* (2013.01); *G06F 8/60* (2013.01); *H04L 67/10* (2013.01); *H04L 67/34* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | |
|---|---|---|
| 6,006,264 A | 12/1999 | Colby et al. |
| 6,513,112 B1 | 1/2003 | Craig et al. |
| 6,687,846 B1 | 2/2004 | Adrangi et al. |
| 6,950,848 B1 | 9/2005 | Yousefi'zadeh et al. |
| 6,961,783 B1 | 11/2005 | Cook et al. |
| 7,027,582 B2 | 4/2006 | Khello et al. |
| 7,185,046 B2 | 2/2007 | Ferstl et al. |
| 7,350,075 B1 | 3/2008 | Eastham et al. |

(Continued)

OTHER PUBLICATIONS

Armour et al.: "A Heuristic Algorithm and Simulation Approach to Relative Location of Facilities"; Management Science, vol. 9, No. 2 (Jan. 1963); pp. 294-309.

(Continued)

*Primary Examiner* — Wissam Rashid
(74) *Attorney, Agent, or Firm* — Knobbe, Martens, Olson & Bear, LLP

(57) ABSTRACT

The deployment of content and computing resources for implementing a distributed software application can be optimized based upon customer location. The volume and geographic origin of incoming requests for a distributed software application are determined. Based upon the volume and geographic origin of the incoming requests, content and/or one or more instances of the distributed software application may be deployed to a geographic region generating a significant volume of requests for the distributed software application. Content and/or instances of a distributed software application might also be speculatively deployed to a geographic region in an attempt to optimize the performance, cost, or other attribute of a distributed software application.

19 Claims, 7 Drawing Sheets

(56) References Cited

U.S. PATENT DOCUMENTS

| | | |
|---|---|---|
| 7,376,716 B2 | 5/2008 | Dilley et al. |
| 7,451,230 B2 | 11/2008 | Corrado et al. |
| 7,603,439 B2 | 10/2009 | Dilley et al. |
| 7,613,815 B1 | 11/2009 | Prakash et al. |
| 8,155,126 B1 | 4/2012 | Mao et al. |
| 8,195,605 B2 | 6/2012 | Chellappa et al. |
| 8,250,135 B2 | 8/2012 | Driesen et al. |
| 8,356,074 B1 | 1/2013 | Ehrlich et al. |
| 8,392,928 B1 | 3/2013 | Forys et al. |
| 8,443,167 B1 | 5/2013 | Fallone et al. |
| 8,521,885 B1 | 8/2013 | Richardson et al. |
| 8,527,645 B1 | 9/2013 | Proffit et al. |
| 8,645,700 B2 | 2/2014 | Smith et al. |
| 8,775,553 B2 | 7/2014 | Cansino et al. |
| 9,219,686 B2 | 12/2015 | Hilt et al. |
| 9,900,402 B1 | 2/2018 | Li et al. |
| 10,033,699 B2 | 7/2018 | Sullivan et al. |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 10,157,135 B2 | 12/2018 | Richardson et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 10,200,402 B2 | 2/2019 | Radlein et al. |
| 10,200,492 B2 | 2/2019 | MacCarthaigh et al. |
| 10,205,698 B1 | 2/2019 | Petersen et al. |
| 10,218,584 B2 | 2/2019 | Ellsworth et al. |
| 10,225,322 B2 | 3/2019 | Richardson et al. |
| 10,225,326 B1 | 3/2019 | Puchala et al. |
| 10,225,362 B2 | 3/2019 | Watson |
| 10,230,819 B2 | 3/2019 | Richardson et al. |
| 10,257,307 B1 | 4/2019 | Baldwin |
| 10,264,062 B2 | 4/2019 | Richardson et al. |
| 10,270,878 B1 | 4/2019 | Uppal et al. |
| 2002/0049842 A1 | 4/2002 | Huetsch et al. |
| 2002/0138649 A1 | 9/2002 | Cartmell et al. |
| 2002/0143798 A1 | 10/2002 | Lisiecki et al. |
| 2003/0005036 A1 | 1/2003 | Mitzenmacher |
| 2003/0037284 A1 | 2/2003 | Srinivasan et al. |
| 2003/0105857 A1 | 6/2003 | Kamen et al. |
| 2005/0015471 A1 | 1/2005 | Zhang et al. |
| 2005/0039019 A1 | 2/2005 | Delany |
| 2005/0174989 A1 | 8/2005 | Chen et al. |
| 2005/0192814 A1 | 9/2005 | Challener et al. |
| 2005/0198200 A1 | 9/2005 | Subramanian et al. |
| 2005/0201302 A1 | 9/2005 | Gaddis et al. |
| 2005/0267928 A1 | 12/2005 | Anderson et al. |
| 2005/0286564 A1 | 12/2005 | Hatley et al. |
| 2006/0106938 A1 | 5/2006 | Dini et al. |
| 2006/0129766 A1 | 6/2006 | Cassia et al. |
| 2006/0143442 A1 | 6/2006 | Smith |
| 2006/0221971 A1 | 10/2006 | Andrieux et al. |
| 2007/0233896 A1 | 10/2007 | Hilt et al. |
| 2007/0280197 A1 | 12/2007 | Pearlman et al. |
| 2007/0294419 A1 | 12/2007 | Ulevitch |
| 2008/0049615 A1 | 2/2008 | Bugenhagen |
| 2008/0066072 A1 | 3/2008 | Yurekli et al. |
| 2008/0222647 A1 | 9/2008 | Taylor et al. |
| 2008/0235383 A1 | 9/2008 | Schneider |
| 2008/0270882 A1 | 10/2008 | Rollins et al. |
| 2009/0138582 A1 | 5/2009 | Turk |
| 2010/0074268 A1 | 3/2010 | Raza |
| 2010/0106934 A1 | 4/2010 | Calder et al. |
| 2010/0115342 A1 | 5/2010 | Shigeta et al. |
| 2010/0125673 A1 | 5/2010 | Richardson et al. |
| 2010/0125675 A1 | 5/2010 | Richardson et al. |
| 2010/0161564 A1 | 6/2010 | Lee et al. |
| 2010/0161565 A1 | 6/2010 | Lee et al. |
| 2010/0191854 A1 | 7/2010 | Isci et al. |
| 2010/0223364 A1 | 9/2010 | Wei |
| 2010/0228819 A1 | 9/2010 | Wei |
| 2010/0306382 A1 | 12/2010 | Cardosa et al. |
| 2010/0322255 A1 | 12/2010 | Hao et al. |
| 2011/0016214 A1 | 1/2011 | Jackson |
| 2011/0106949 A1 | 5/2011 | Patel et al. |
| 2011/0113467 A1 | 5/2011 | Agarwal et al. |
| 2011/0154350 A1 | 6/2011 | Doyle et al. |
| 2011/0219372 A1 | 9/2011 | Agarwal et al. |
| 2011/0255445 A1 | 10/2011 | Johnson et al. |
| 2011/0296370 A1 | 12/2011 | Ferris et al. |
| 2012/0011190 A1 | 1/2012 | Driesen et al. |
| 2012/0072608 A1 | 3/2012 | Peters et al. |
| 2012/0014249 A1 | 4/2012 | Mao et al. |
| 2012/0089700 A1 | 4/2012 | Safruti et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0117621 A1 | 5/2012 | Kondamuru et al. |
| 2012/0136697 A1 | 5/2012 | Peles et al. |
| 2012/0142310 A1 | 6/2012 | Pugh et al. |
| 2012/0173760 A1 | 7/2012 | Jog et al. |
| 2012/0179817 A1 | 7/2012 | Bade et al. |
| 2012/0209942 A1 | 8/2012 | Zehavi et al. |
| 2013/0003547 A1 | 1/2013 | Motwani et al. |
| 2013/0003735 A1 | 1/2013 | Chao et al. |
| 2013/0018945 A1 | 1/2013 | Vendrow et al. |
| 2013/0046883 A1 | 2/2013 | Lientz et al. |
| 2013/0073808 A1 | 3/2013 | Puthalath et al. |
| 2013/0111035 A1 | 5/2013 | Alapati et al. |
| 2013/0346465 A1 | 12/2013 | Maltz et al. |
| 2013/0346470 A1 | 12/2013 | Obstfeld et al. |
| 2013/0346614 A1 | 12/2013 | Baughman et al. |
| 2014/0007239 A1 | 1/2014 | Sharpe et al. |
| 2014/0013403 A1 | 1/2014 | Shuster |
| 2014/0195686 A1 | 7/2014 | Yeager et al. |
| 2014/0200036 A1* | 7/2014 | Egner ............... H04W 8/245 455/456.3 |
| 2014/0297866 A1 | 10/2014 | Ennaji et al. |
| 2014/0298021 A1 | 10/2014 | Kwon et al. |
| 2014/0351413 A1 | 11/2014 | Smith et al. |
| 2015/0081877 A1 | 3/2015 | Sethi et al. |
| 2015/0088964 A1 | 3/2015 | Shiell et al. |
| 2015/0341431 A1 | 11/2015 | Hartrick et al. |
| 2015/0358276 A1 | 12/2015 | Liu et al. |
| 2015/0358436 A1 | 12/2015 | Kim et al. |
| 2015/0363113 A1 | 12/2015 | Rahman et al. |
| 2016/0028598 A1 | 1/2016 | Khakpour et al. |
| 2016/0065475 A1 | 3/2016 | Hilt et al. |
| 2016/0104346 A1 | 4/2016 | Ovalle et al. |
| 2016/0255042 A1 | 9/2016 | Newton |
| 2016/0269927 A1 | 9/2016 | Kim et al. |
| 2016/0337426 A1 | 11/2016 | Shribman et al. |
| 2017/0099345 A1 | 4/2017 | Leach |
| 2017/0163425 A1 | 6/2017 | Kaliski, Jr. |
| 2018/0077109 A1 | 3/2018 | Hoeme et al. |
| 2018/0077110 A1 | 3/2018 | Huston, III et al. |
| 2018/0278717 A1 | 9/2018 | Richardson et al. |
| 2018/0287916 A1 | 10/2018 | Mizik et al. |
| 2018/0302322 A1 | 10/2018 | Richardson et al. |
| 2018/0332107 A1 | 11/2018 | Marr et al. |
| 2018/0351904 A1 | 12/2018 | Mizik et al. |
| 2018/0367498 A1 | 12/2018 | Bliss et al. |
| 2019/0007515 A1 | 1/2019 | Baldwin et al. |
| 2019/0020562 A1 | 1/2019 | Richardson et al. |
| 2019/0028562 A1 | 1/2019 | Watson et al. |
| 2019/0044787 A1 | 2/2019 | Richardson et al. |
| 2019/0044846 A1 | 2/2019 | Howard et al. |
| 2019/0073303 A1 | 3/2019 | Marshall et al. |
| 2019/0089542 A1 | 3/2019 | Richardson et al. |
| 2019/0098109 A1 | 3/2019 | Watson |
| 2019/0121739 A1 | 4/2019 | Richardson et al. |
| 2019/0129908 A1 | 5/2019 | Kumarasamy |
| 2019/0140922 A1 | 5/2019 | Ellsworth et al. |

(56) References Cited

OTHER PUBLICATIONS

Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Arends et al., DNS Security Introduction and Requirements, RFC 4033, Mar. 2005, 21 pages.
Ariyapperuma et al., "Security Vulnerabilities in DNS and DNS-SEC." The Second International Conference on Availability, Reliability and Security, IEEE, 2007, 8 pages.
Chandramouli et al., "Challenges in Securing the Domain Name System." IEEE Security & Privacy4.1 (2006),pp. 84-87.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
Eastlake, Donald, Domain Name System Security Extensions, RFC 2535, Mar. 1999, 47 pages.
JH Software, Moving a DNS Server to a New IP Address, last updated Jan. 26, 2006, 1 page.
Office Action in Application No. 09729072.0 dated Dec. 7, 2018.
Office Action in European Application No. 11767118.0 dated Jan. 29, 2019.
Examination Report in Indian Application No. 3105/DELNP/2013, dated Feb. 19, 2019.
Extended Search Report in European Application No. 18156163 dated Sep. 3, 2018.
Examination Report in Indian Application No. 4487/DELNP/2013 dated Dec. 28, 2018.
Office Action in European Application No. 13770602.4 dated Mar. 11, 2019.

* cited by examiner

OPTIMIZED DEPLOYMENT BASED UPON CUSTOMER LOCALITY

BACKGROUND

Distributed software applications (referred to herein as "cloud applications") are commonly utilized to provide content and other functionality to end users. For instance, a cloud application might be configured and utilized to provide an electronic commerce ("e-commerce") World Wide Web ("Web") site. The e-commerce Web site might provide functionality for searching and browsing available products, adding desired products to an e-commerce shopping cart, and paying for purchased products. As a part of this functionality, the e-commerce Web site might provide various types of content to the customer, such as text, images, video, and other types of content. Other types of cloud applications can be configured to provide other types of functionality.

In order to ensure a positive customer experience, cloud applications such as those described above must be configured and operated in a performant manner. Customers might become frustrated and discontinue use of a cloud application if the customer perceives that the application is operating slowly. This might occur, for instance, if network bandwidth, computing resources, or other resources utilized in the provision of the cloud application are at or near maximum capacity.

It is with respect to these and other considerations that the disclosure made herein is presented.

DETAILED DESCRIPTION

Figure 1:
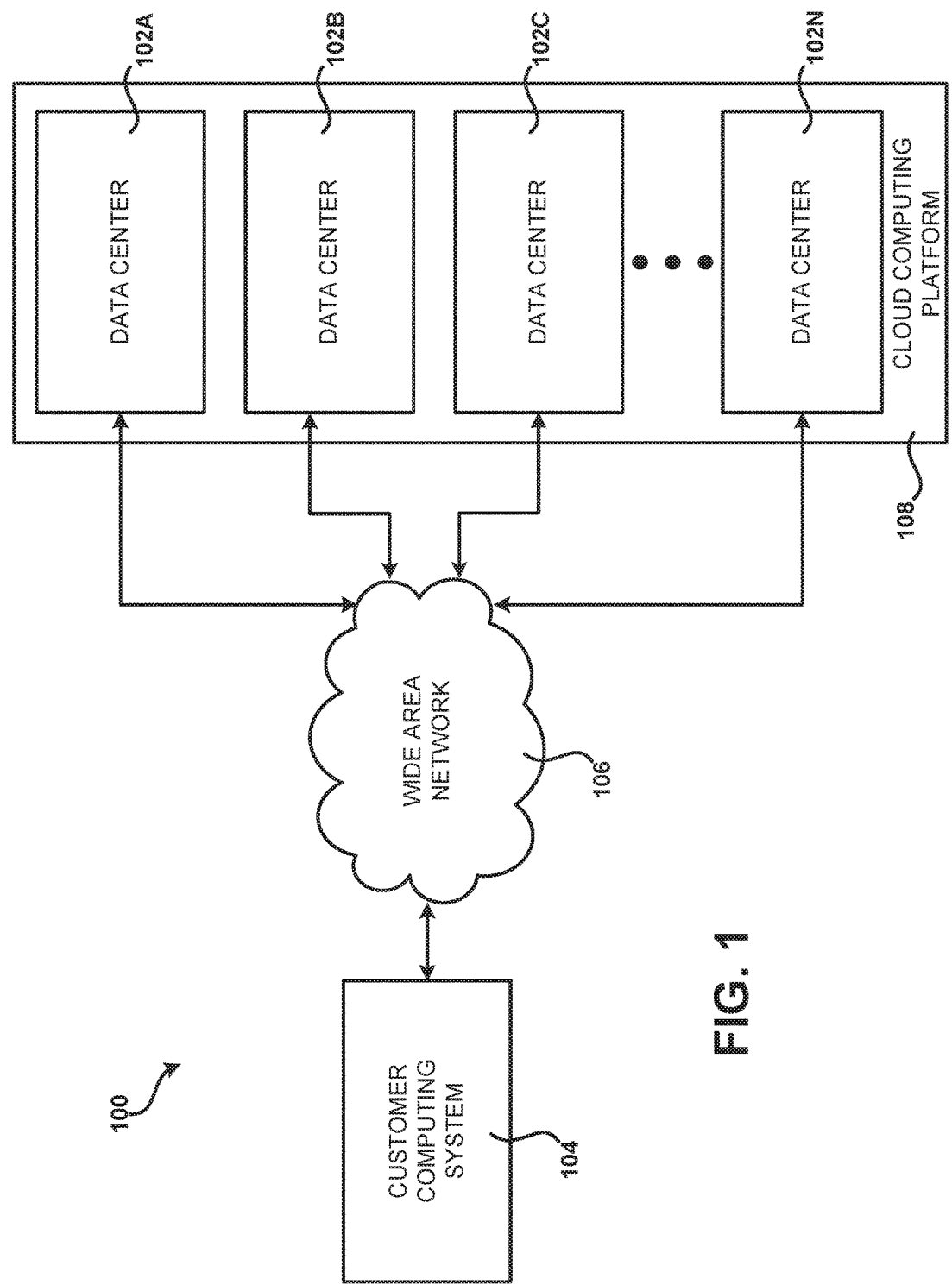
FIG. 1 is a system and network diagram showing aspects of one illustrative operating environment for the embodiments disclosed herein for optimizing the deployment of a cloud application and/or content based upon customer locality.

The following detailed description is directed to technologies for optimized deployment of a cloud application and/or content based upon customer locality. Utilizing the technologies described herein, computing resources for providing a cloud application and/or content can be deployed proximately to the customers that utilize the application and the content. By locating computing resources for providing the cloud application and/or the content near the consumer, the perceived performance of the cloud application might be improved.

According to one aspect disclosed herein, a cloud computing platform is configured to provide instances of computing resources for executing a cloud application. For example, the cloud computing platform might provide virtual machine instances ("instances") for executing a cloud application, such as an e-commerce application or another type of distributed cloud application. Software components that implement the cloud application are deployed to the virtual machine instances.

The cloud computing platform is also provided with functionality for optimizing the deployment of the computing resources that provide the cloud application and/or content served by the cloud application based upon customer locality. In particular, the cloud computing platform includes a deployment component in one embodiment that is configured to determine the volume of incoming requests for the cloud application. The deployment component is also configured to determine the geographic location from which the requests for the cloud application are originating. For instance, the deployment component might utilize an Internet Protocol ("IP") address associated with each request to determine the geographic origin of the request.

The deployment component is also configured to determine if a particular geographic region is generating a significant volume of request for the cloud application. This determination might be made based upon the volume of incoming requests, the geographic location from which the incoming requests are originating, and other factors. Whether a particular volume of requests is significant might be defined by an owner or maintainer of the cloud application. For instance, the owner of a cloud application might define a certain volume of requests per time period as being a significant number of requests.

When the deployment component determines that a significant volume of requests is coming from a particular geographic region, the deployment component is configured to deploy instances of the cloud application in or near the geographic region that is generating the significant volume of requests. Content utilized by the cloud application might also be deployed in the geographic region. The cloud computing platform is then configured such that requests for the cloud application and/or content generated in the geographic region will be handled by the instances located in the region. The decision as to whether to deploy instances of computing resources might also be made based upon other factors, such as the cost of deploying new instances of the cloud application or operating instances of the cloud application in a particular region.

Using the mechanisms described above, instances of a cloud application and associated content may be physically located closer to the customers utilizing a cloud application. By locating the computing resources and content closer to the consumer, the performance of the cloud application might be improved. This process might be performed, for instance, in response to a spike in demand for the application from a particular geographic region. According to other aspects, the deployed instances might be terminated once the spike in demand for the application from a particular region sub sides.

According to another embodiment disclosed herein, the deployment component is further configured to optimize the deployment of a cloud application and/or content through speculative deployment. In this embodiment, instances of a cloud application are speculatively deployed to a geographic region. As used herein, the term speculative deployment refers to the transfer and preparation of content or software of a cloud application and/or the allocation or assignment of computing resources to a cloud application, in the absence of any information indicating that such a deployment would improve or diminish the performance of the application, cost of providing the application, or other metric for evaluating the operation of the cloud application.

Once content and/or instances of a cloud application have been speculatively deployed to a geographic location, the deployment component measures the impact of the deployment. For instance, the deployment component might determine whether the deployment improved the performance of the cloud application, decreased the cost of operating the cloud application, or had another type of impact on another metric for evaluating the operation of the cloud application. If the deployment has a positive impact, the deployed content and/or instances are maintained in the geographic location. Additionally, if a deployment has a positive impact, a "hill climbing" algorithm might be utilized to determine an optimal number of instances for the location. Hill climbing is a well-known mathematical optimization technique. Other such techniques might also be utilized. If the deployment has a negative impact, the content and/or instances might be removed from the geographic location. Additional details regarding the various processes described above for optimizing the deployment of a cloud application will be presented below with regard to FIGS. 1-7.

According to yet another embodiment, content and/or instances of a cloud application might be deployed in anticipation of the occurrence of an event. For instance, according to one implementation, a customer or maintainer of the cloud application might be permitted to specify that a spike in demand for the cloud application is anticipated to occur at a particular time in a particular region. In response to receiving this information, a deployment component might anticipatorily deploy content and/or instances of the cloud application to the specified region in advance of the specified event. In this way, the cloud application can be configured to handle anticipated changes in demand.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 that includes a cloud computing platform 108 for executing a distributed cloud application.

The cloud computing platform 108 can provide computing resources for executing the cloud application on a permanent or an as-needed basis. The computing resources provided by the cloud computing platform 108 may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute cloud applications, including World Wide Web ("Web") servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the cloud computing platform 108 are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for optimized deployment of a cloud application and/or content will be described below with regard to FIG. 2.

The customers and other consumers of the cloud computing platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote consumers may be utilized. It should also be appreciated that combinations of such networks might also be utilized.

The customer computing system 104 is a computer utilized by a customer or other consumer of the cloud computing platform 108. For instance, the customer computing system 104 may be a server computer, a desktop or laptop personal computer, a tablet computer, a wireless telephone, a personal digital assistant ("PDA"), an e-reader, a game console, a set-top box, or any other computing device capable of accessing the cloud computing platform 108.

As will be described in greater detail below, the customer computing system 104 may be utilized to configure aspects of the computing resources provided by the cloud computing platform 108. In this regard, the cloud computing platform 108 might provide a Web interface through which aspects of its operation may be configured through the use of a Web browser application program executing on the customer computing system 104. Alternatively, a stand-alone application program executing on the customer computing system 104 might access an application programming interface ("API") exposed by the cloud computing platform 108 for performing the configuration operations. Other mechanisms for configuring the operation of the cloud computing platform 108, including specifying whether the deployment of a cloud application may be optimized in the manner disclosed herein, might also be utilized.

According to embodiments disclosed herein, the capacity of purchased computing resources provided by the cloud computing platform 108 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of the cloud computing platform 108 can be scaled on-demand.

Auto scaling is one mechanism for scaling computing resources in response to increases or lulls in demand for the resources. Auto scaling allows customers of the cloud computing platform 108 to configure the platform 108 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. As will also be described in greater detail below, the auto scaling functionality provided by the cloud computing platform 108 might also be utilized to optimize the deployment of the cloud application and related content based upon the locality of the users of the cloud application. Details regarding this process will be provided below.

As will also be described in greater detail below, the cloud computing platform 108 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the configuration and cache warming logic to allocate, configure, and prime new instances of computing resources. Additional details regarding a deployment component utilized by the cloud computing platform 108 will be described below with regard to FIGS. 2-7.

Figure 2:
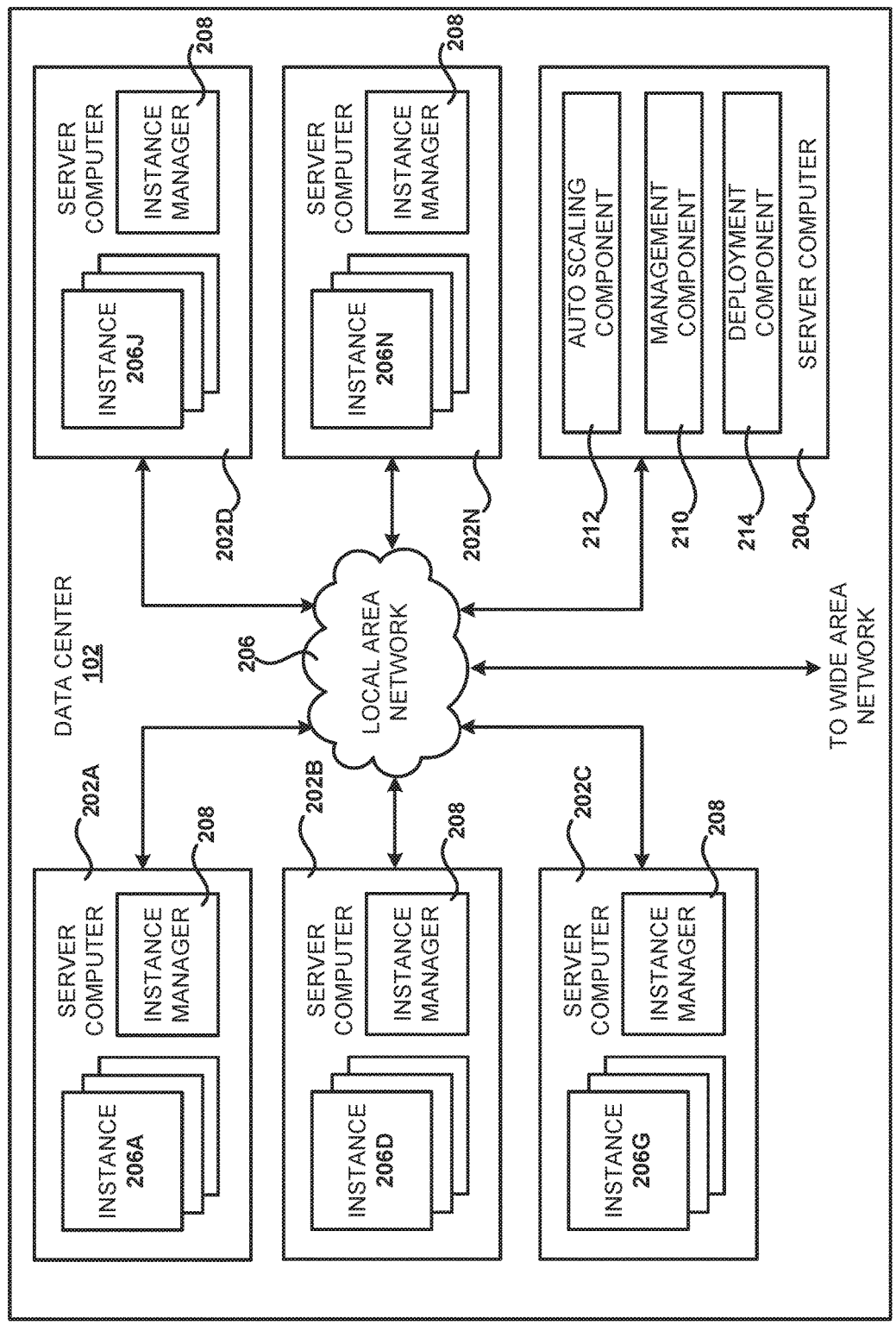
FIG. 2 is a computing system diagram that illustrates a configuration for a data center that implements the concepts and technologies disclosed herein for optimizing the deployment of a cloud application and/or content based upon customer locality, according to one embodiment.

FIG. 2 is a computing system diagram that illustrates one configuration for a data center 102 that implements the concepts and technologies disclosed herein for optimizing the deployment of a cloud application and/or content based upon customer locality. The example data center 102 shown in FIG. 2 includes several server computers 202A-202N (which may be referred herein singularly as "a server computer 202" or in the plural as "the server computers 202") for providing computing resources for executing a cloud application. The server computers 202 may be standard server computers configured appropriately for providing the computing resources described above. For instance, in one implementation the server computers 202 are configured to provide instances 206A-206N of computing resources.

In one embodiment, the instances 206A-206N (which may be referred herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to host an instance manager 208 capable of providing one or more computing resources. The instance manager 208 might be a hypervisor or another type of program configured to manage the execution of multiple instances 206 on a single server 202, for example. As discussed above, each of the instances 206 may be configured to execute all or a portion of a cloud application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the cloud computing platform 108 might utilize the customer computing system 104 to access the management component 210 to configure various aspects of the operation of cloud computing platform 108 and the instances 206 purchased by the customer. For example, the customer may purchase instances and make changes to the configuration of the instances. The customer might also specify settings regarding how the purchased instances are to be scaled in response to demand and whether the instances should be deployed based upon customer locality.

The auto scaling component 212 scales the number of instances 206 based upon rules defined by a customer of the cloud computing platform 108. In one embodiment, for instance, the auto scaling component 212 allows a customer to specify scale up rules for use in determining when new instances should be instantiated and scale down rules for use in determining when existing instances should be terminated.

The auto scaling component 212 may execute on a single server computer 204 or in parallel across multiple server computers 202 in the cloud computing platform 108. In addition, the auto scaling component 212 may consist of a number of subcomponents executing on different server computers 202 or other computing devices in the cloud computing platform 108. The auto scaling component 212 may be implemented as software, hardware, or any combination of the two. The auto scaling component 212 may monitor available computing resources in the cloud computing platform 108 over an internal management network, for example. As will be described in greater detail below, the auto scaling component 212 might also be utilized to scale and de-scale instances of a cloud application based upon customer locality and potentially other factors.

As discussed briefly above, the data center 102 is also configured with a deployment component 214 to assist customers in the deployment of new instances 206 of computing resources. The deployment component 214 may receive a launch configuration from a customer that includes data describing how new instances 206 should be configured. For example, the launch configuration might specify one or more applications that should be installed in new instances 206, provide scripts and/or other types of code to be executed for configuring new instances 206, provide cache warming logic specifying how an application cache should be prepared, and other types of information.

The deployment component 214 utilizes the launch configuration and cache warming logic to launch, configure, and prime new instances 206. The launch configuration, cache warming logic, and other information may be specified by a customer using the management component 210 or by providing this information directly to the deployment component 214. Other mechanisms might also be utilized to configure the operation of the deployment component 210.

As will be described in greater detail below, the deployment component 214 also provides functionality for deploying content and computing resources for implementing a cloud application based upon customer location. For instance, in one embodiment, the deployment component is configured to determine the volume and geographic origin of incoming requests for a cloud application. Based upon the volume and geographic origin of the incoming requests, the deployment component is configured to deploy content and/or one or more instances of the cloud application to a geographic region generating a significant volume of requests for the cloud application. Content and/or instances of a cloud application might also be speculatively deployed to a geographic region in an attempt to optimize the performance, cost, or other attribute of a cloud application. The deployment component 210 might operate in conjunction with other components, such as the auto scaling component 212, the management component 210, or other components not shown in FIG. 2. Additional details regarding this process and other functionality provided by the deployment component 214 will be provided below with regard to FIGS. 3-7.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices might also be utilized for balancing a load between each of the data centers 102A-102N, between each of the server computers 202A-202N in each data center 102, and between instances 206 purchased by each customer of the cloud computing platform 108. These network topologies and devices should be apparent to those skilled in the art.

It should be appreciated that the data center 102 described in FIG. 2 is merely illustrative and that other implementations might be utilized. In particular, functionality described herein as being performed by the management component 210, the auto scaling component 212, and the deployment component 214 might be performed by other components or by a combination of these or other components. Additionally, it should be appreciated that this functionality might be implemented in software, hardware, or a combination of software and hardware. Other implementations should be apparent to those skilled in the art.

It should also be appreciated that while the embodiments disclosed herein are primarily described as operating in conjunction with one or more data centers 102, other embodiments might also be utilized. For instance, a distributed network of peer devices, such as wireless mobile telephones, set top boxes, or other types of computing systems, might also be utilized to provide the functionality disclosed herein. Other configurations might also be utilized.

Figure 3:
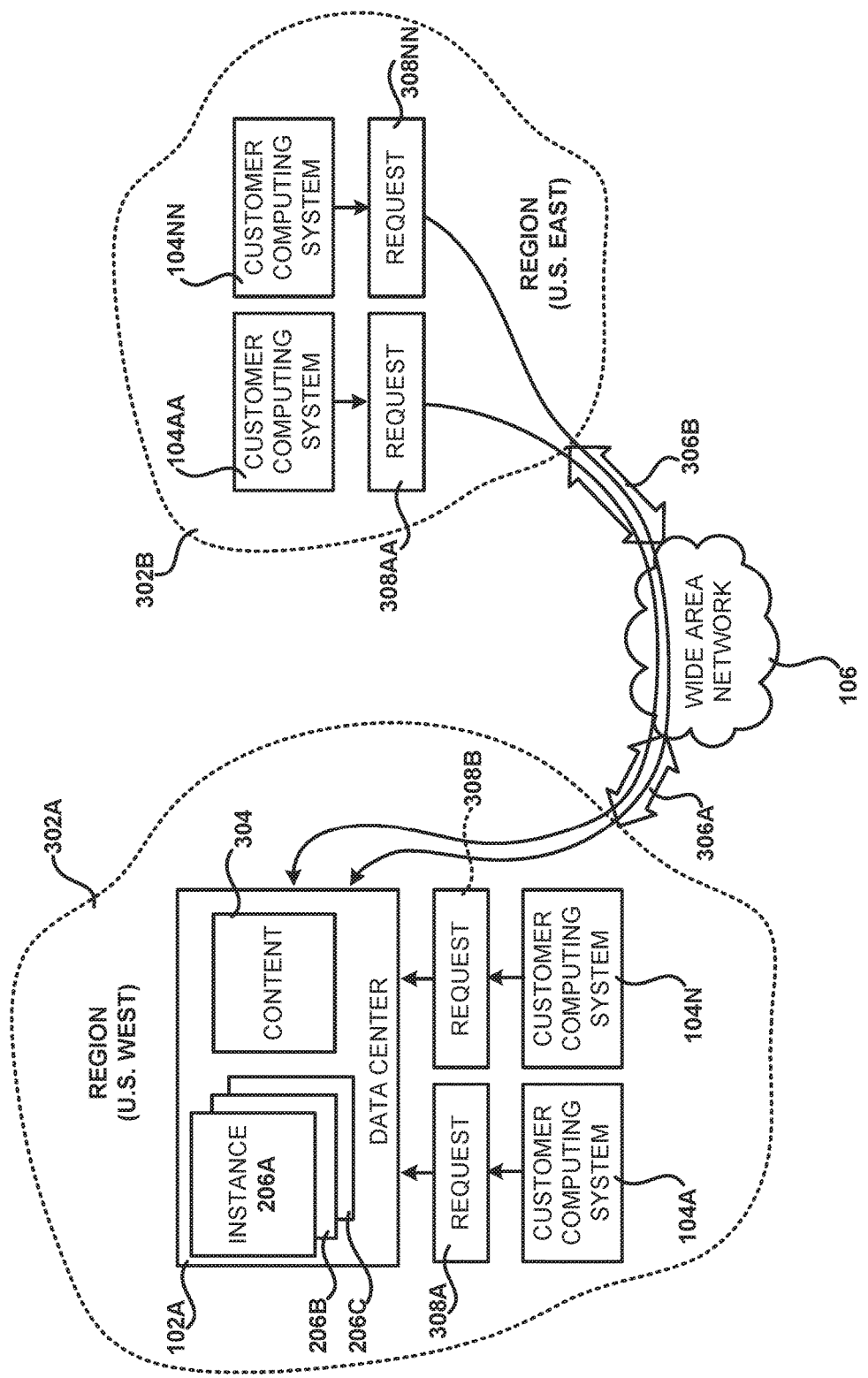
FIG. 3 is a network diagram showing aspects of a non-optimized deployment of a cloud application and associated content.

FIG. 3 is a network diagram showing aspects of a non-optimized deployment of a cloud application and associated content. In the example shown in FIG. 3, a single data center 102A located in a geographic region 302A is utilized to implement a cloud application. The data center 304 executes three instances 206A-206C that implement the cloud application and stores content 304 served by the content. The content might be Web pages, images, text, video, animation, scripts and other types of code, programs, and other types of data that might be transmitted to a customer computing system 104 from a cloud application.

In the example shown in FIG. 3, requests 308A-308B received at the data center 102A from customer computing systems 104A-104N located in the region 302A are directed to the data center 102A for handling. The instances 206A-206C receive these requests and respond accordingly, such as by serving content 304 in response to the requests 308A-308N.

The instances 206A-206C also handle requests originating in other geographic regions. In the example shown in FIG. 3, the region 302A is connected to another region 302B, by way of appropriate network links 306A-306B to a WAN 106, such as the Internet. Requests 308AA-308NN originating from customer computing systems 104AA-104NN in the region 302B are directed over the WAN 106 to the instances 206A-206C. The instances 206A-206C receive these requests and respond accordingly, such as by serving content 304 in response to the requests 308AA-308NN.

In the event of a spike in demand from the region 302B, the network links 306A-306B may become congested. As a result, customers located in the region 302B might perceive a significant slowdown in the performance of the cloud application provided by the instances 206A-206C. This might be, in part, because delivery of the content 304 is slowed as a result of the congestion on the network links 306A-306B. The optimization mechanisms discussed below with regard to FIGS. 4-7 address this and other issues in an attempt to improve the perceived performance of the cloud application felt by customers located outside of the region 302A.

Figure 4:
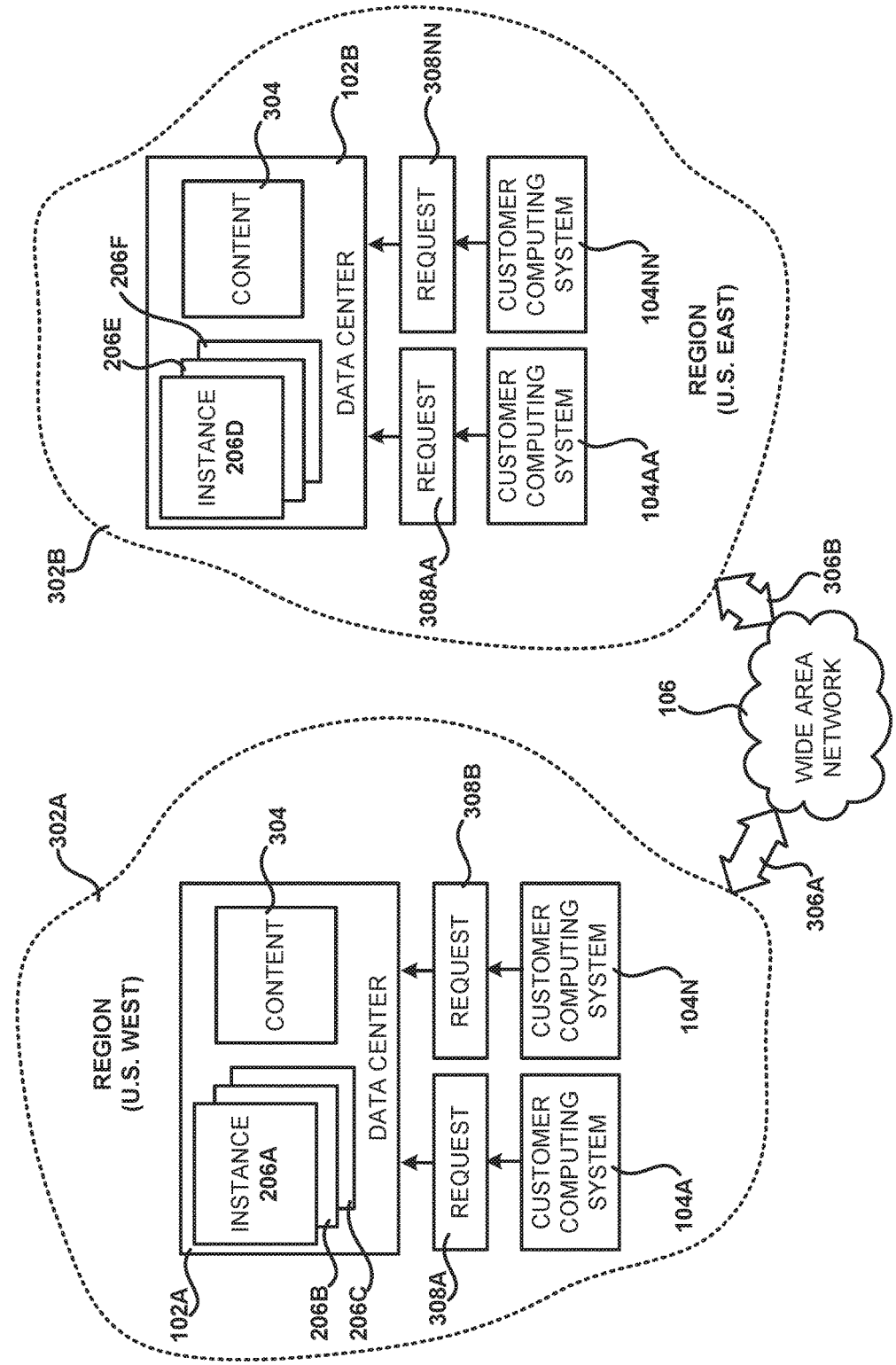
FIG. 4 is a network diagram showing the cloud application and associated content of FIG. 3 following an optimization utilizing some of the concepts and technologies disclosed herein, according to one embodiment.

FIG. 4 is a network diagram showing the cloud application and associated content of FIG. 3 following an optimization utilizing some of the concepts and technologies disclosed herein, according to one embodiment. In the example shown in FIG. 4, a data center 102B is provided in the region 302B. Instances 206D-206F of a cloud application have also been deployed in the data center 102B. Additionally, the content 304 utilized by the cloud application has also been deployed to the data center 304. As discussed above, the instances 206D-206F and the content 304 might be deployed in the data center 102B in the region 302B in response to determining that a significant volume of requests for the cloud application are being generated from the region 302B. The operator or owner of the cloud application might define the volume of requests that cause instances and content to be deployed in the data center 102B.

Figure 5:
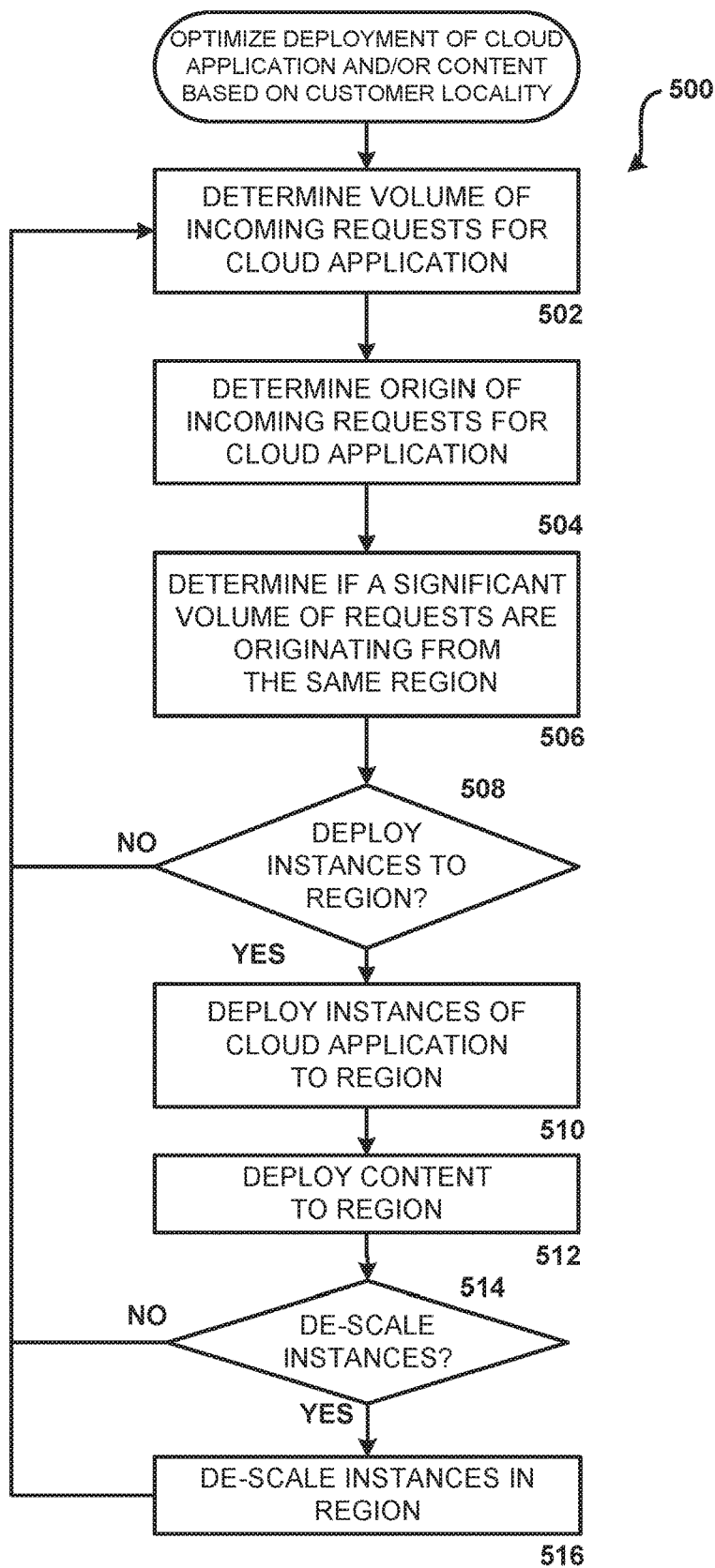
FIG. 5 is a flow diagram showing one illustrative routine for optimizing the deployment of a cloud application and/or content based upon customer locality, according to one embodiment disclosed herein.
Figure 6:
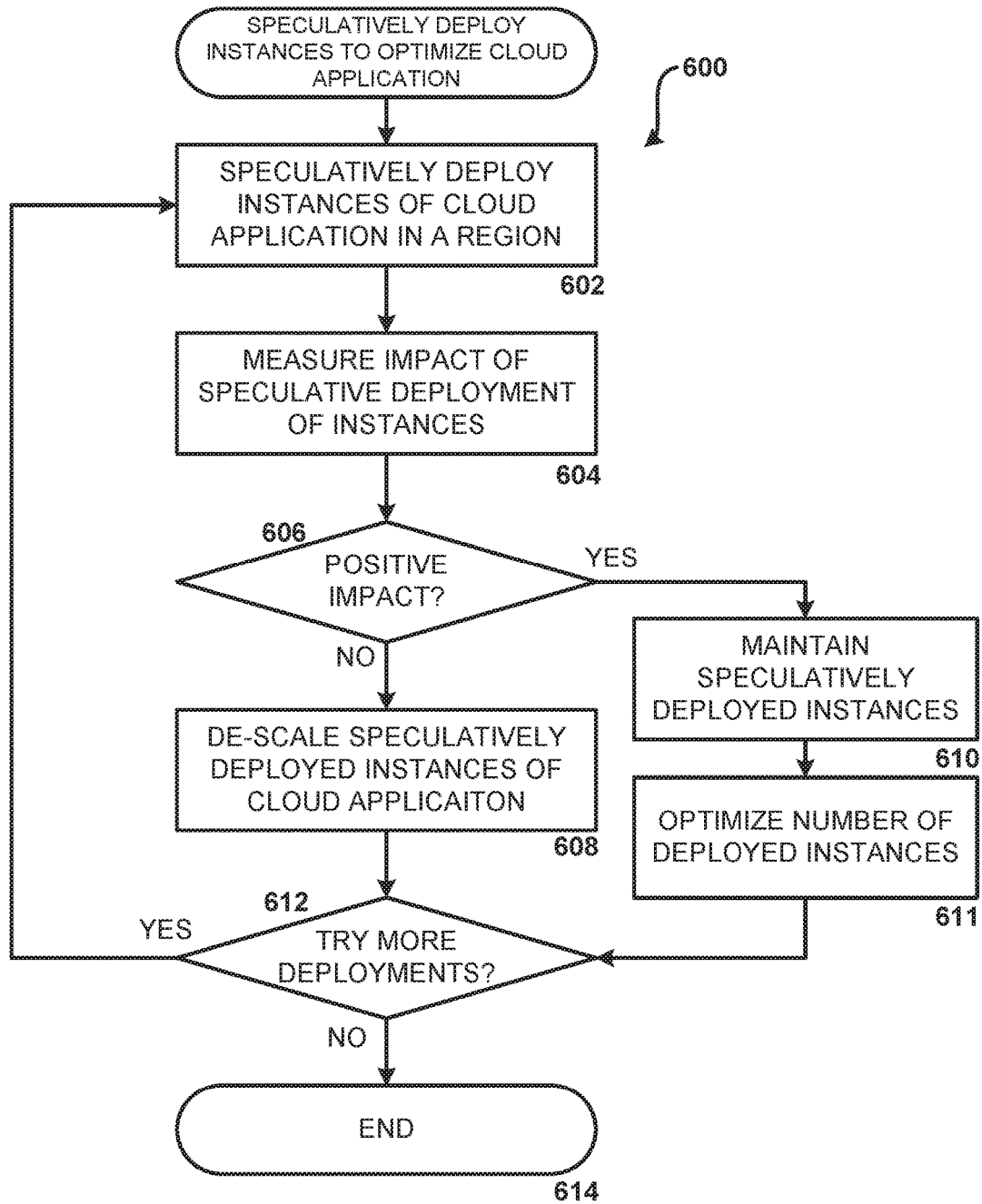
FIG. 6 is a flow diagram showing one illustrative routine for optimizing the deployment of a cloud application and/or content by speculative deployment, according to one embodiment disclosed herein.
Figure 7:
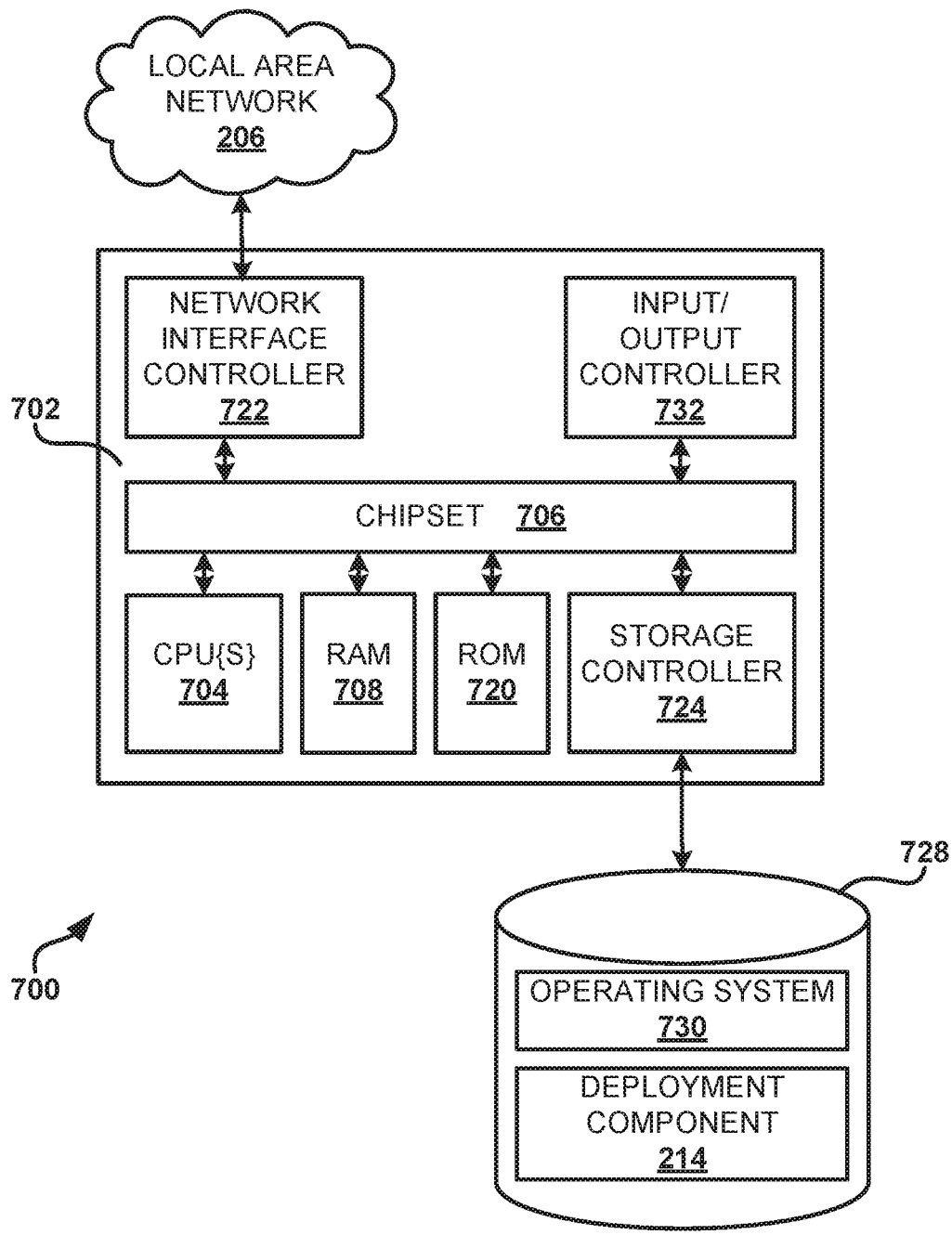
FIG. 7 is a computer architecture diagram showing an illustrative computer hardware architecture for implementing the various computing devices described in embodiments presented herein.

Following deployment of the instances 206D-206F, requests 308AA-308NN for the cloud application from customer computing systems 104AA-104NN in the region 302B might be routed to the data center 102B. Content utilized by the cloud application might be provided from the data center 102B rather from than from the data center 102A, thereby reducing traffic on the WAN 106. Additionally, in embodiments, some functionality might continue to be performed at the data center 102A. For instance, the underlying functionality provided by the cloud application (such as an e-commerce shopping cart, payment functionality, etc.) might be provided by the data center 102A while the content 304 is provided by the data center 102B to customer computing systems 104AA-104NN in the region 302B. Other configurations might also be utilized. FIGS. 5-7, described below, will provide additional details regarding these and other processes for optimizing the deployment of a cloud application and/or content 304 in embodiments disclosed herein.

It should be appreciated that the examples shown in FIGS. 3 and 4 are merely illustrative and should not be considered limiting in any way. It should also be appreciated that the regions 302A-302B might be any type of geographical area, such as a city, county, state, country, continent, and suitable subdivisions thereof. Moreover, although two regions 302A-302B are shown in FIGS. 3 and 4, the embodiments disclosed herein might be utilized with virtually any number of regions.

It should also be appreciated that while the subject matter disclosed herein has been presented primarily in the context of moving instances and/or content geographically closer to customers, it should be appreciated that instances and/or content might also be moved and/or speculatively deployed based upon other factors. For instance, a customer might be considered "closer" in terms of required bandwidth, network latency, network route, or other factors rather than geographic distance. For instance, Burma might be geographically closer to Bangalore, but customers in Burma might obtain better performance by reading content from Singapore depending upon network throughput and/or latency. Using this information, the location and number of instances and/or content might be deployed based upon network volume, network route, latency, or other factors associated with incoming requests.

Turning now to FIG. 5, additional details will be provided regarding one illustrative process disclosed herein for optimizing the deployment of content and/or a cloud application based upon customer locality. It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing one illustrative routine 500 for optimizing the deployment of a cloud application and/or content based upon customer locality, according to one embodiment disclosed herein. In one embodiment, the routine 500 is performed by the deployment component 214. It will be appreciated that another module or component may also perform the routine 500, such as the management component 210. A combination of modules and components might also perform the routine 500.

The routine 500 begins at operation 502, where the deployment component 214 determines the volume of incoming requests for a cloud application. The deployment component 214 might make this determination based upon information received from the instances 206 that implement the cloud application, based upon information received from other components, or in another manner. Another component might also make this determination. Once the volume of incoming requests has been determined, the routine 500 proceeds from operation 502 to operation 504.

At operation 504, the deployment component 210 determines the origin of the incoming requests for the cloud application. As discussed briefly above, this determination might be made based upon the IP address associated with each incoming request 308, or in another manner. Another component might also make this determination. Once the geographic origin for each incoming request 308 has been determined, the routine 500 proceeds from operation 504 to operation 506.

At operation 506, the deployment component 214 determines whether a significant volume of requests 308 is originating from the same geographic region. For instance, in the example shown in FIGS. 3 and 4, the deployment component 214 might determine that a significant volume of requests is originating from the region 302B. Another component might also be utilized to make such a determination. As discussed above, an owner or operator of the cloud application might specify the volume of requests that are considered significant enough to warrant the deployment of instances of the cloud application and/or content to a particular geographic region.

From operation 506, the routine 500 proceeds to operation 508, where a determination is made as to whether instances and/or content should be deployed to a region. As discussed above, a variety of factors might be utilized to make this determination, such as the volume of requests received from the region and the cost of deploying instances and/or content to the region. If instances are not to be deployed to the region, the routine 500 proceeds from operation 508 to operation 502, described above, where another such determination is made. If instances and/or content are to be deployed, the routine 500 proceeds from operation 508 to operation 510.

At operation 510, the deployment component 214 causes instances 206 of the cloud application to be deployed to the region generating the significant volume of requests. The routine 500 then proceeds to operation 512, where the deployment component 214 causes content 304 to be deployed to the region generating the significant volume of requests. In the example illustrated in FIGS. 3 and 4, for instance, the deployment component 214 might cause the content 304 to be deployed to the data center 102B. The deployment component 214 might also cause the instances 206D-206F to be instantiated in the data center 102B. It should be appreciated that instances 206 of the cloud application might be deployed without deploying the content 304. Additionally, the content 304 might be deployed without deploying instances 206 of the cloud application. When content 304 is deployed, one or more instances 206 might be deployed and configured to serve the content 304.

The deployment component 214 might also cause the cloud application and potentially other components to be configured such that the instances 206E-206F handle requests 308AA-308NN originating in the region 302B. For instance, one or more of the instances 206D-206F might be configured to serve the content 304 in response to requests 308AA-308NN originating in the region 302B. It should be appreciated that the deployment component 214 might utilize functionality provided by the auto scaling component 212, the instance manager 208, or other components to deploy the instances 206 and content 304 in a particular geographic region.

It should be appreciated that various configuration operations might be performed in order to cause requests for the cloud application originating from a particular region to be satisfied by instances and/or content located in or proximately to the region. For instance, settings in one or more load balancers might be configured to cause requests for the cloud application to be routed to the region, one or more Domain Name Service ("DNS") entries in a DNS server might be modified to cause requests received from a client device for the cloud application to be routed to the region, and/or hyperlinks referring the content provided by the cloud application might be modified to refer to content located in the region. Other types of configuration operations might also be performed.

From operation 512, the routine 500 proceeds to operation 514, where the deployment component 214 periodically determines whether it is necessary to de-scale some or all of the instances previously deployed to a geographic region. For instance, the deployment component might determine whether the volume of requests for the cloud application from a particular geographic region remains to be significant. If the volume remains significant, the deployed instances 206 and content 304 might be maintained in the region. In this case, the routine 500 proceeds from operation 514 to operation 502, described above. If, however, the volume is no longer significant, the routine 500 might proceed from operation 514 to operation 516 where some or all of the instances 206 deployed to the region might be de-scaled. Some or all of the content 304 might also be removed from the region. Other operations might also be performed in response to determining that a volume of requests for a cloud application no longer warrants a deployment of instances 206 or content 304 to a particular geographic region. From operation 516, the routine 500 proceeds to operation 502, described above.

It should be appreciated that the decision as to whether to deploy and de-scale instances of computing resources might also be made based upon other factors, such as the cost of deploying or de-scaling instances of the cloud application and/or the cost of operating instances of the cloud application in a particular region. In this case, the instances 206 and the content 304 might be deployed in response to a spike in demand if the cost of deployment is below a certain threshold. Other factors might also be utilized individually or in combination to determine when it is appropriate to deploy or de-scale content 304 and/or instances 206 of a cloud application to or from a particular geographic region.

FIG. 6 is a flow diagram showing one illustrative routine 600 for optimizing the deployment of a cloud application and/or content by speculative deployment, according to one embodiment disclosed herein. As mentioned above, the term speculative deployment refers to the transfer and preparation of content or software of a cloud application and/or the allocation or assignment of computing resources to a cloud application, in the absence of any information indicating that such a deployment would improve or diminish the performance of the application, cost of providing the application, or other metric for evaluating the operation of the cloud application.

In the embodiment illustrated in FIG. 6, instances 206 of a cloud application and/or content 304 is speculatively deployed to a region 302. Once content and/or instances of a cloud application have been speculatively deployed to a region 302, the deployment component 214 measures the impact of the deployment. For instance, the deployment component 214 might determine whether the deployment improved the performance of the cloud application, decreased the cost of operating the cloud application, or had another type of impact on another metric for evaluating the operation of the cloud application. If the deployment has a positive impact, the deployed content and/or instances may be maintained in the geographic location. If the deployment has a negative impact, the content and/or instances might be removed from the region 302. Additional details regarding this process are provided below with regard to FIG. 6.

The routine 600 begins at operation 602, where the deployment component 214 causes instances 206 and/or content 304 to be speculatively deployed to a region 302. For instance, in the example shown in FIGS. 3 and 4, the deployment component 214 might cause the instances 206D-206F and/or the content 304 to be deployed to the region 302B. When the content 304 is deployed to a region 302, one or more instances 206 might also be deployed to serve the content 304 in response to requests originating in the region 302. Once the instances 206 and/or content 304 have been deployed, the routine 600 proceeds from operation 602 to operation 604.

At operation 604, the deployment component 214 measures the impact of the speculative deployment of instances 206 and/or content 304. The impact of the deployment might be measured as a function of performance of the cloud application, the cost of providing the cloud application or the content 304, or another metric. The deployment component 214 might utilize information received from other components to measure the impact of the deployment. Another component or components might also perform this functionality.

If the measured impact of the deployment is positive, the routine 600 proceeds from operation 606 to operation 610. At operation 610, the speculatively deployed instances 206 and/or content are maintained in the geographic region 302 to which they were deployed. From operation 610, the routine 600 proceeds to operation 611, where the number of deployed instances might be increased or decreased in order to optimize the number of instances deployed in the region or the content deployed to the region. As discussed above, an optimization technique, such as hill climbing, might be utilized to optimize the number of instances and/or deployment of content to arrive at an optimal configuration. Once this process has been performed, the routine 600 then proceeds from operation 611 to operation 612.

If the measured impact of the deployment is negative, the routine 600 proceeds from operation 606 to operation 608. At operation 608, the speculatively deployed instances 206 are de-scaled from the region 302 in which they were deployed. Additionally, the content 304 might also be removed from the region 302 in which it was deployed. Appropriate configuration changes might also be made to ensure that requests 308 for the cloud application and/or content 304 are handled by instances 306 operating in another region. For instance, as discussed above, changes might be made in load balancers, DNS servers, and/or hyperlinks referring to content served by the cloud application. The routine 600 then proceeds from operation 608 to operation 612.

At operation 612, a determination is made as to whether additional speculative deployments of instances 206 and/or content 304 remain to be evaluated. If so, the routine 600 proceeds from operation 612 to operation 602, described above, where instances 206 and content 304 might be speculatively deployed to other regions in the manner described above. If no additional deployments remain to be tested, the routine 600 proceeds to operation 614, where it ends.

FIG. 7 shows an example computer architecture for a computer 700 capable of executing the software components described above. The computer architecture shown in FIG. 7 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 700 includes a baseboard, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 are standard programmable processors that perform arithmetic and logical operations necessary for the operation of the computer 700.

The CPUs 704 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard. The chipset 706 may provide an interface to a random access memory ("RAM") 708, used as the main memory in the computer 700. The chipset 706 may further provide an interface to a computer-readable storage medium such as a read-only memory ("ROM") 720 or non-volatile RAM ("NVRAM") for storing basic routines that that help to startup the computer 700 and to transfer information between the various components and devices. The ROM 720 or NVRAM may also store other software components necessary for the operation of the computer 700 in accordance with the embodiments described herein.

The computer 700 may operate in a networked environment using logical connections to remote computing devices and computer systems through the network 206. The chipset 706 may include functionality for providing network connectivity through a network interface controller ("NIC") 722, such as a gigabit Ethernet adapter. The NIC 722 is capable of connecting the computer 700 to other computing devices over the network 206. It should be appreciated that multiple NICs 722 may be present in the computer 700, connecting the computer to other types of networks and remote computer systems.

The computer 700 may be connected to a mass storage device 728 that provides non-volatile storage for the computer. The mass storage device 728 may store system programs, application programs, other program modules, and data, which have been described in greater detail herein. The mass storage device 728 may be connected to the computer 700 through a storage controller 724 connected to the chipset 706. The mass storage device 728 may consist of one or more physical storage units. The storage controller 724 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 728 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 728 is characterized as primary or secondary storage, and the like.

For example, the computer 700 may store information to the mass storage device 728 by issuing instructions through the storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 728 by detecting the physical states or characteristics of one or more particular locations within the physical storage units.

In addition to the mass storage device 728 described above, the computer 700 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 728 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 728 may store other system or application programs and data utilized by the computer 700, such as the deployment component 214 and/or the other software components described above.

In one embodiment, the mass storage device 728 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the routines 500 and 600, described with regard to FIGS. 5 and 6, respectively.

The computer 700 may also include an input/output controller 732 for receiving and processing input from a number of input devices, such as a keyboard, a mouse, a touchpad, a touch screen, an electronic stylus, or other type of input device. Similarly, the input/output controller 732 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for deploying cloud applications and content based upon customer locality have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for optimizing deployment of one or more virtual machine instances of a network-based application over a distributed network, the computer-implemented method comprising:
   determining a number of requests for communication with a network-based application by one or more computers over a network, wherein the network-based application is one of a plurality of distributed software applications executed by at least one of a plurality of virtual machine instances at a data center in a network-based environment;
   determining a geographic location from which each of the requests originates;
   determining a first geographic region meeting a predetermined number of requests for the network-based application based upon the number of the requests and the geographic location from which each of the requests originates;
   determining a cost associated with deploying one or more instances of the network-based application to the first geographic region meeting the predetermined number of requests;
   determining whether to deploy the one or more instances of the network-based application to the first geographic region meeting the predetermined number of requests based upon the determined cost and the number of incoming requests;
   responsive to determining the first geographic region meeting the predetermined number of requests for the network-based application, deploying the one or more instances of the network-based application to the first geographic region;
   determining an updated number of requests received for the network-based application from the first geographic region; and
   terminating at least one of the instances of the network-based application deployed to the first geographic region based upon the updated number of requests received for the network-based application from the first geographic region.

2. The computer-implemented method of claim 1, wherein deploying one or more instances of the network-based application comprises deploying one or more virtual machine instances executing the network-based application to the first geographic region meeting the predetermined number of requests.

3. The computer-implemented method of claim 2 further comprising causing the deployed virtual machine instances to execute in the first geographic region meeting the predetermined number of requests and to handle requests for the network-based application generated from within the first geographic region.

4. The computer-implemented method of claim 1, wherein deploying one or more instances of the network-based application comprises deploying content served by the network-based application together with the one or more instances of the network-based application to the first geographic region meeting the predetermined number of requests.

5. The computer-implemented method of claim 4, wherein deploying one or more instances of the network-based application further comprises deploying one or more virtual machine instances configured to serve the content to the first geographic region meeting the predetermined number of requests.

6. The computer-implemented method of claim 5 further comprising causing the deployed virtual machine instances to execute in the first geographic region meeting the predetermined number of requests and to handle requests for the content generated from within the first geographic region.

7. The computer-implemented method of claim 6, wherein causing the deployed virtual machine instances to handle requests for the content generated from within the first geographic region comprises modifying settings in one or more load balancers.

8. The computer-implemented method of claim 6, wherein causing the deployed virtual machine instances to handle requests for the content generated from within the first geographic region comprises modifying entries in one or more domain name servers.

9. The computer-implemented method of claim 6, wherein causing the deployed virtual machine instances to handle requests for the content generated from within the first geographic region comprises modifying one or more hyperlinks.

10. The computer-implemented method of claim 1, wherein the geographic location from which each of the requests originates is determined based upon an Internet Protocol (IP) address associated with each of the incoming requests.

11. The computer-implemented method of claim 1, wherein the deployment of the one or more instances of the network-based application is further based upon a network route of the incoming requests for the network-based application.

12. A computer system comprising:
a plurality of server computers executing a distributed software application on a plurality of virtual machine instances at a data center in a networked-based environment; and
a computer in communication with the plurality of server computers over a network, wherein the computer executes a deployment component configured to:
determine a first geographic region meeting a predetermined number of requests for communication with the distributed software application over a network;
determine a cost associated with deploying one or more instances of the network-based application to the first geographic region meeting the predetermined number of requests;
responsive to determining the first geographic region, deploy the one or more instances of the distributed software application to the first geographic region based upon the determined cost and the number of incoming requests;
determine an updated number of requests received for the distributed software application from the first geographic region; and
terminate at least one of the instances of the distributed software application deployed to the first geographic region based upon the updated number of requests.

13. The computer system of claim 12, wherein determining a first geographic region meeting a predetermined number of requests for communication with the distributed software application comprises:
determining a number of incoming requests for the distributed software application;
determining a geographic location from which each of the incoming requests originates; and
determining a first geographic region meeting a predetermined number of requests for communication with the distributed software application based upon the number of the incoming requests and the geographic location from which each of the incoming requests originates.

14. The computer system of claim 12, wherein the determination as to whether to terminate at least one of the instances of the distributed software application deployed to the first geographic region is further based upon a cost of terminating the at least one of the instances.

15. The computer system of claim 12, wherein the deployment component is further configured to:
determine a cost associated with deploying the one or more instances of the distributed software application to the first geographic region meeting the predetermined number of requests; and
determine whether to deploy the one or more instances of the distributed software application to the first geographic region meeting the predetermined number of requests based upon the determined cost and the number of incoming requests.

16. The computer system of claim 12, wherein the deployment component is further configured to:
deploy one or more instances of the distributed software application to a second geographic region;
measure an impact of the speculative deployment of the one or more instances of the distributed software application to the second geographic region;
maintain the instances of the distributed software application deployed to the second geographic region in response to measuring a first impact; and
terminate the instances of the distributed software application deployed to the second geographic region in response to measuring a second impact.

17. A non-transitory computer-readable storage medium having computer-executable instructions stored thereupon which, when executed by a computer, cause the computer to:
determine a first geographic region meeting a predetermined number of requests for a network-based application based upon a number of requests received over a network for the network-based application and a geographic location from which each of the requests originates, wherein the network-based application is one of a plurality of distributed software applications executed by at least one of a plurality of virtual machine instances at a data center in a network-based environment;
determine a cost associated with deploying the one or more instances of the network-based application to the first geographic region meeting the predetermined number of requests;
determine whether to deploy the one or more instances of the network-based application to the first geographic region meeting the predetermined number of requests based upon the determined cost and the number of incoming requests; and
cause one or more instances of the network-based application to be deployed to the first geographic region.

18. The computer-readable storage medium of claim 17, wherein causing one or more instances of the application to be deployed comprises deploying, over a network, one or more virtual machine instances executing the network-based application to the first geographic region.

19. The computer-readable storage medium of claim 17, having further computer-executable instructions stored thereupon which, when executed by the computer, cause the computer to:

periodically determine an updated number of requests for the network-based application received from the first geographic region; and terminate at least one of the instances of the network-based application deployed to the first geographic region based upon the updated number of requests received for the network-based application from the first geographic region.

\* \* \* \* \*

UNITED STATES PATENT AND TRADEMARK OFFICE
CERTIFICATE OF CORRECTION

| | | |
|---|---|---|
| PATENT NO. | : 10,467,042 B1 | Page 1 of 1 |
| APPLICATION NO. | : 16/261401 | |
| DATED | : November 5, 2019 | |
| INVENTOR(S) | : Benjamin W. Mercier | |

It is certified that error appears in the above-identified patent and that said Letters Patent is hereby corrected as shown below:

In the Specification

Column 2, Line 67, delete "sub sides." and insert --subsides.--.

In the Claims

Column 17, Line 38, Claim 12, delete "networked-based" and insert --network-based--.

Signed and Sealed this
Fifth Day of May, 2020

Andrei Iancu
*Director of the United States Patent and Trademark Office*